March 26, 1968  L. K. BELL  3,375,425
SERVO REVERSIBLE CONTROL APPARATUS FOR DC MOTOR
Filed March 29, 1965  3 Sheets-Sheet 1

INVENTOR.
LAWRENCE K. BELL

BY
ATTORNEY

INVENTOR.
LAWRENCE K. BELL

INVENTOR.
LAWRENCE K. BELL

United States Patent Office 3,375,425
Patented Mar. 26, 1968

3,375,425
SERVO REVERSIBLE CONTROL APPARATUS FOR D.C. MOTOR
Lawrence K. Bell, Minneapolis, Minn., assignor to Honeywell Inc., Minneapolis, Minn., a corporation of Delaware
Filed Mar. 29, 1965, Ser. No. 443,571
7 Claims. (Cl. 318—302)

ABSTRACT OF THE DISCLOSURE

A servo reversible control apparatus to control the speed and direction of movement of a DC motor by means of a reversible polarity command signal and a motor produced velocity feedback signal, the motor being energized from two bridge rectifier networks, each bridge network having four SCR's, and with a forward drive electronic network connected to control one of the bridge networks and a reverse drive electronic network connected to control the other bridge network in a manner to turn-on two of the SCR's and to modulate-on the other two SCR's, including a cross coupling to render one bridge inoperative when the other is operative, and including a relay structure to reverse energize the motor on a command for speed slowdown of the motor and then utilize the motor counter EMF to commutate-off that rectifier network which reverse energized the motor and to energize the other rectifier network to maintain forward energization at the new lower speed.

---

My invention is concerned with an improved control apparatus and particularly with a control apparatus adapted for use in providing servo reversible control of a large horsepower DC motor (for example, greater than 1 horsepower) from a DC error signal which is originated as the summation of a variable magnitude and reversible polarity DC command signal and a motor generated DC feedback signal. I utilize two full wave SCR bridge rectifier circuits to reversibly energize the DC motor to produce a speed and direction of rotation as required by the magnitude and polarity of the command signal. I use the term "SCR" as a generic term broadly meaning a controllable rectifier.

The structure of my invention utilizes solid state circuitry which is constructed and arranged to accommodate all modes of operation required of such a control apparatus. For example, the structure of my invention insures that only one of the two SCR bridge rectifiers will be energized to produce rotation of the motor, the other bridge rectifier being rendered inactive. Furthermore, upon a required reduction in speed of rotation of the motor in a given direction, the bridge rectifier normally driving the motor in this direction is deenergized and the other of the two bridge rectifiers is energized to provide for both dynamic braking and plugging of the motor, causing the motor to abruptly reduce to the lower required speed. Furthermore in the mode of operation requiring only the reduction in speed of the motor, as distinguished from a reversal in direction of the motor, the structure of my invention provides for a resetting of that bridge rectifier which provides dynamic braking and plugging of the motor, resetting this bridge to an inactive condition, and again renders that bridge rectifier active which causes the motor to run at the reduced speed.

Figure 1A:
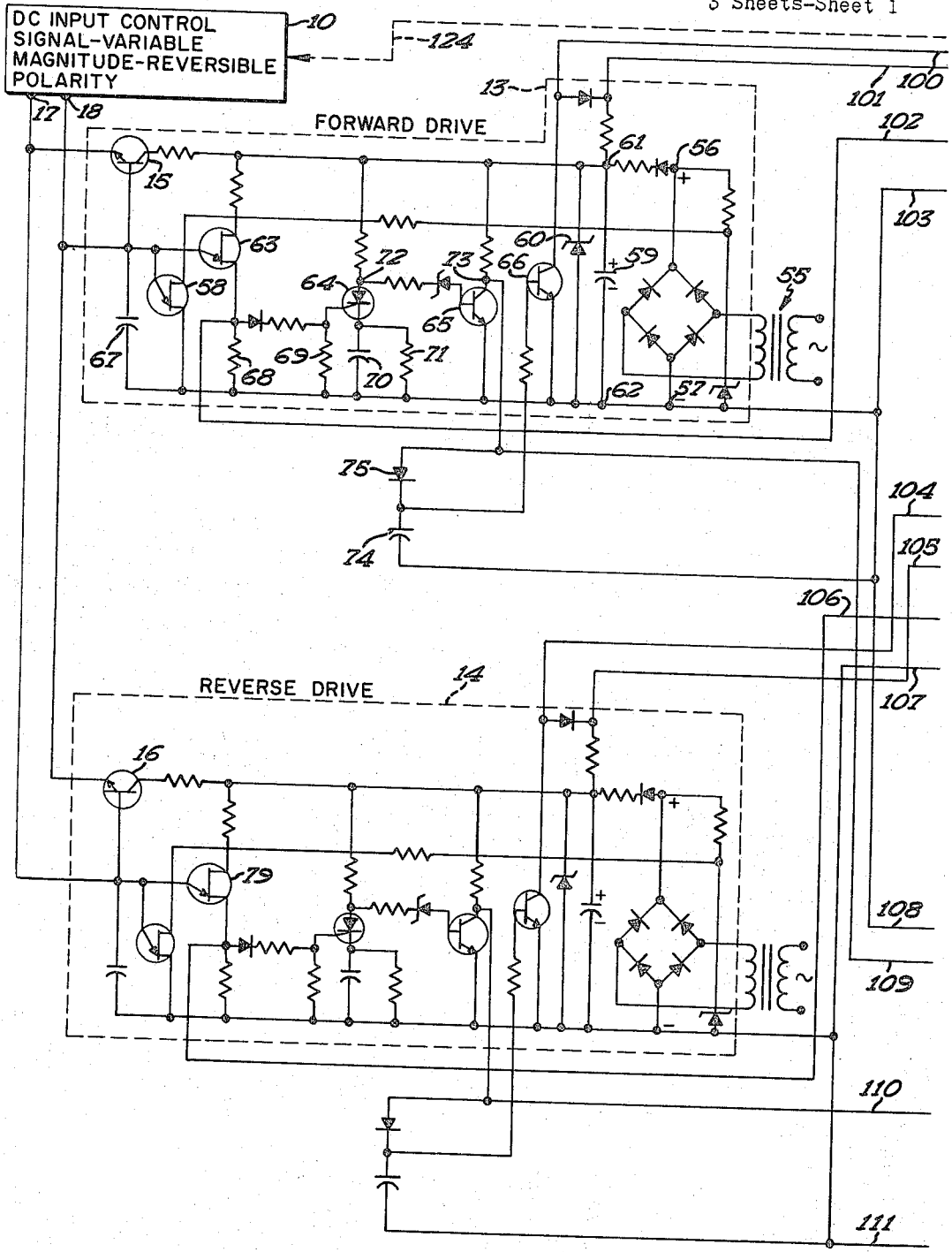
Figure 1B:
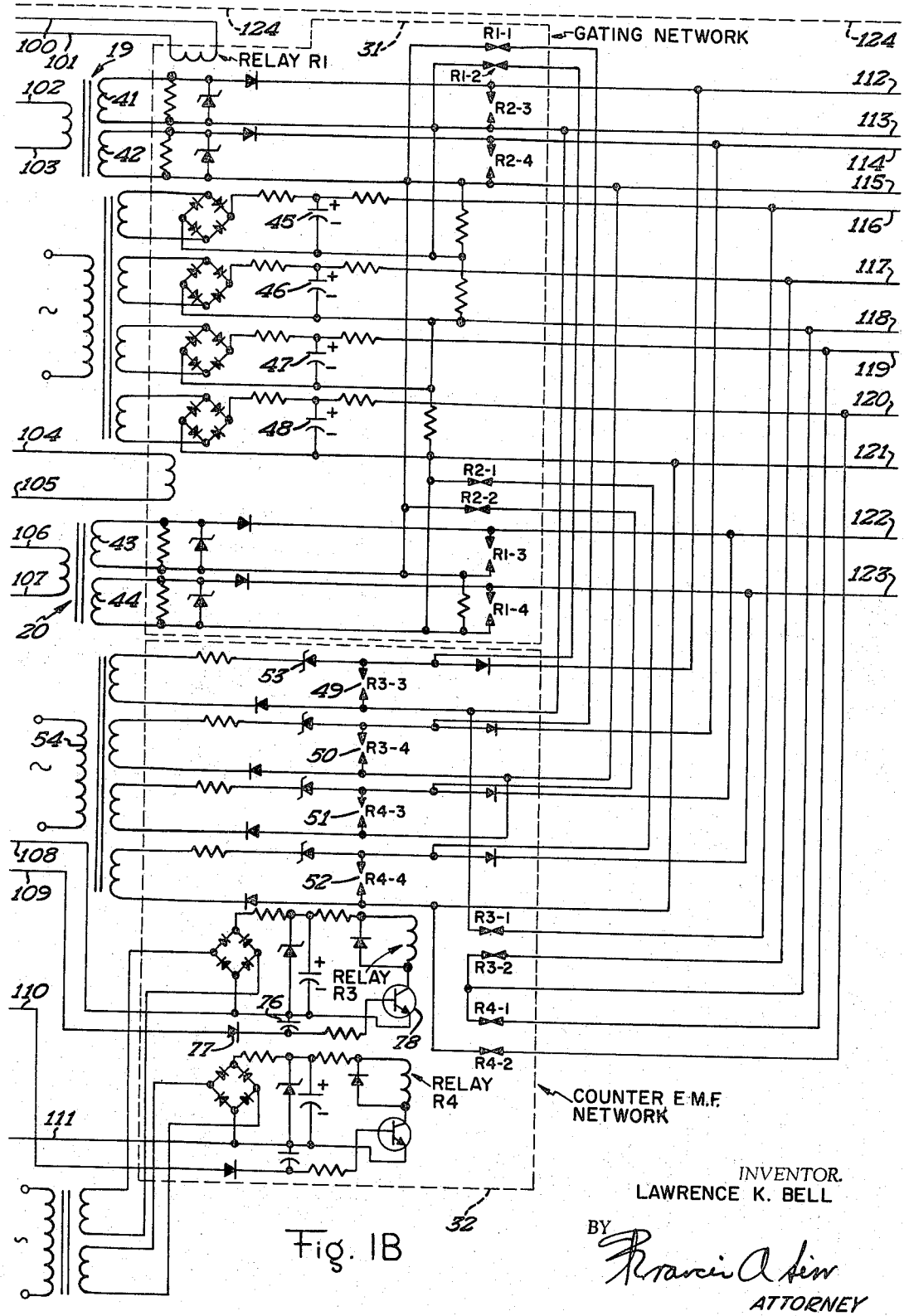
Figure 1C:
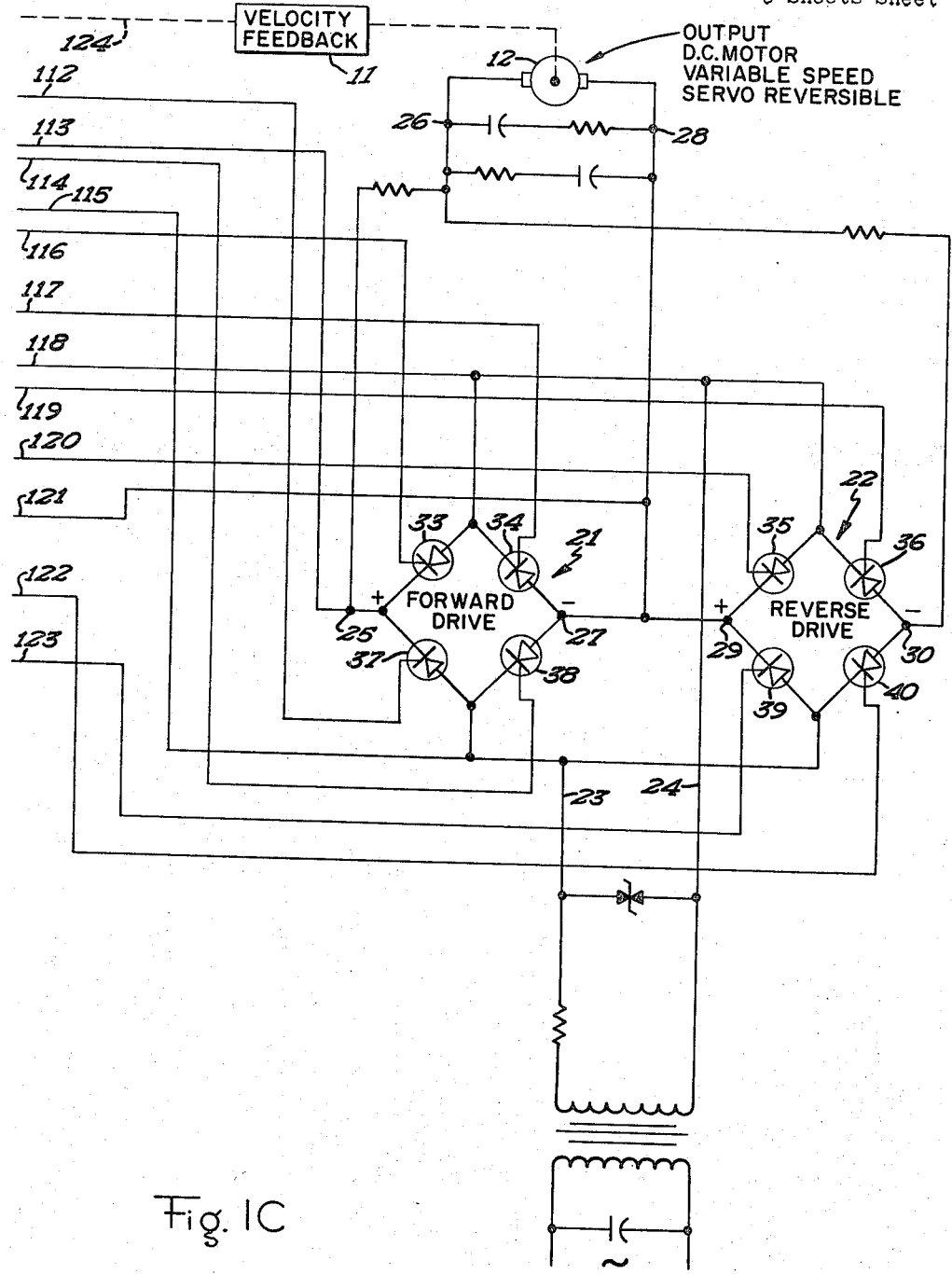

My invention will be apparent to those skilled in the art upon reference to the following specification, claims and drawings, of which:

FIGURES 1a, 1b and 1c are a schematic representation of the preferred embodiment of my invention.

In these figures, like reference numerals are used to designate structural elements which continue from one figure to the other.

Referring now to the above mentioned figures, reference numeral 10 designates a source of error signal which comprises a DC input control signal of a variable magnitude and reversible polarity, this signal being summed with a feedback signal originated by means identified by reference numeral 11 (FIGURE 1c), this feedback signal being generated by operation of DC motor 12. DC motor 12 has been designated as the output and is a shunt wound or permanent magnet motor, with controlled armature. While I have shown armature control, my structure may be utilized to achieve field control of the motor.

The structure of my invention comprises essentially a forward drive channel and a reverse drive channel. Reference numeral 13 (FIGURE 1a) designates a forward drive control network whereas reference numeral 14 designates a reverse drive control network. The forward drive and reverse drive control networks are substantially identical and differ from each other only in the manner in which the input transistor 15 and 16 respectively is connected to the output terminals 17 and 18 of the signal source. This connection is such that when terminal 18 is positive, the forward drive network is rendered active by virtue of conduction of transistor 15 and, when the terminal 17 is positive the reverse drive network is rendered active by virtue of conduction of transistor 16.

It is to be understood that I use the terms "forward" and "reverse" only by way of distinguishing one direction of rotation of motor 12 from the other direction of rotation.

Each of the forward drive and reverse drive networks includes three separate output effects. The first of these output effects is at pulse transformer 19 for the forward drive network and at pulse transformer 20 for the reverse drive network. A second output effect is at relay R1 for the forward drive network and relay R2 for the reverse drive network. The third output effect is at relay R3 for the forward drive network and at relay R4 for the reverse drive network. The specific function of these outputs will be described more completely later in the description of my invention. The general effect to be achieved is such that a forward drive bridge rectifier 21 (FIGURE 1c) is energized when the forward drive network is active, and a reverse drive bridge rectifier 22 is energized when the reverse drive network is active.

As can be seen from FIGURE 1c, each of the forward drive and reverse drive bridge rectifiers comprise four SCR's and each rectifier includes input terminals connected to a source of AC voltage at conductors 23 and 24. Rectifier output terminals are connected to the terminals of motor 12. More specifically, forward drive rectifier includes a positive output terminal 25 which is connected to a first terminal 26 of the motor and a negative output terminal 26 which is connected to a second terminal 28 of the motor. The reverse drive rectifier has a positive output terminal 29 connected to terminal 28 of the motor and a negative output terminal 30 connected to terminal 26 of the motor. By virtue of these connections, rotation of the motor in a forward or reverse direction may be achieved. Furthermore, as will be apparent, a change in the command signal requiring only a reduction in speed of the motor in a particular direction is achieved by opposite energization of the motor to both dynamic brake and plug the motor. Thus, upon a command for a reduction in speed, the motor is reverse energized and, after the proper speed is achieved, the motor is again energized to maintain the slower speed rotation. My invention provides a unique structure for achieving this result.

Referring now to the four relays shown in FIGURE 1b, all four of these relays are provided with a relay winding, two normally closed switches, and two normally open switches. These switches are shown in the normal position, that is with the winding of the relay deenergized. The "1" and "2" switches of each relay are normally closed whereas the "3" and "4" switches are normally open. For example, switches R1–1 and R1–2 are the normally closed switches of relay R1 and switches R1–3 and R1–4 are the normally open switches of relay R1. These relays are fast acting reed switches, and operation, either energizing or deenergizing, cannot exceed 10% of the total cycle time of the AC power supply, that is 1.6 milliseconds for 60 cycles.

In FIGURE 1b I disclose a gating network contained within broken line 31 and a counter EMF network disclosed contained within broken line 32. Each of these networks includes a plurality of voltage sources and the relays R1–R4. The relays function to control the manner in which these voltage sources are connected to the gate electrodes of the various SCR's of the forward drive and reverse drive bridge rectifiers (FIGURE 1c) to achieve the desired control of motor 12.

In order to more clearly establish the inter-relation of the structure of FIGURE 1b and the manner in which this structure controls the SCR's of the bridge rectifiers of FIGURE 1c, I designate the SCR's 33, 34, 35 and 36 as directional SCR's. It is the function of these SCR's to be continuously gated to a conductive condition whenever the respective bridge rectifier of which they are a portion is energized to produce energization of motor 12. SCR's 37, 38, 39 and 40 are designated as modulating SCR's and these modulating SCR's are either controlled from pulse transformers 19 or 20 (FIGURE 1b), or, in a particular mode of operation, are controlled from the counter EMF network 32, as will be apparent. At this point it should be mentioned that the modulating SCR's, when controlled from pulse transformers 19 and 20 are effective to produce a required speed of rotation of DC motor 12. However, when they are gated from the counter EMF network 32, they are gated to a full on condition for the purpose of dynamic braking and plugging the motor 12. This condition occurs only when there is a command for reduction in the speed of the motor, as distinguished from a change in direction of rotation of the motor.

Referring to gating network 31 of FIGURE 1b, pulse transformer 19 includes a secondary winding 41 which is connected to the gate electrodes of modulating transistor 37 and a second secondary winding 42 which is connected to the gate electrodes of modulating SCR 38.

Pulse transformer 20 includes a secondary winding 43 which is connected to the gate electrode of modulating SCR 40 and includes a secondary winding 44 which is connected to the gate electrode of modulating SCR 39.

Gating network 31 also includes four sources of DC steady state gating voltage designated by means of reference numerals 45, 46, 47 and 48. Source 45 is adapted to be connected to the gate electrode of directional SCR 33. Source 46 is adapted to be connected to the gate electrode of directional SCR 34. Source 47 is adapted to be connected to the gate electrode of directional SCR 36, and source 48 is adapted to be connected to the gate electrode of directional SCR 35.

Referring to the counter EMF network 32, this network includes four pulsating sources of DC voltage 49, 50, 51 and 52. Each of these pulsating sources of DC voltage is controlled by a zener diode, for example, zener diode 53 associated with source 49, such that a pulse of voltage is produced at the peak of the AC source of which the primary winding 54 is connected.

Source 49 is connected to the gate electrode of modulating SCR 37. Source 50 is connected to the gate electrode of modulating SCR 38. Source 51 is connected to the gate electrode of modulating SCR 40, and source 52 is connected to the gate electrode of modulating SCR 39.

In the above description of the structure of FIGURE 1b I have described the various sources as being connected to the gate electrodes of the various SCR's of FIGURE 1c. The recited connection is controlled by relays R1—R4, as will be apparent.

Referring now to FIGURE 1a, the structure of one of the drive networks will be described. The following description pertains equally well to the other drive network since it is substantially identical.

Forward drive network 13 receives its energizing voltage from a transformer 55, connected to a source of AC voltage, this source also being a source of synchronization to which other transformers of the various figures are connected. At terminals 56 and 57 a pulsating full wave DC voltage is provided and this voltage is connected to a synchronizing unijunction transistor 58. A filter capacitor 59 and a regulating zener diode 60 provide steady state DC voltage at terminals 61 and 62, this voltage being used to energize transistor 15, unijunction transistor 63, SCR 64 and transistors 65 and 66.

It will be remembered that conduction of transistor 15 is controlled by the error signal present at terminals 17 and 18. The magnitude of this error signal determines the speed of rotation of motor 12 (FIGURE 1c) and the polarity of this signal determines which of the networks 13 and 14 will be energized. For this description it is assumed that terminal 18 is positive. Conduction of transistor 15, as achieved by this error signal, is effective to charge capacitor 67. However, capacitor 67 may begin to charge only when the interbase voltage of synchronizing unijunction transistor 58 is above a certain value. Since pulsating DC voltage is applied to the base electrodes of this unijunction transistor, capacitor 67 is maintained discharged for a given dead band zone which exists between adjacent DC half wave pulses. Capacitor 67 then begins to charge as the interbase voltage of synchronizing unijunction transistor 58 is above a given value, as it is for the major portion of each half wave of the AC source provided by transformer 55.

A further unijunction transistor 63 has its input connected to capacitor 67 and the time of firing of this unijunction (as related to AC source 55) is determined by the voltage build up on capacitor 67, this time of firing being indicative of the magnitude of the error voltage present at terminals 17 and 18. A firing of this unijunction transistor generates a control pulse across resistor 68 and across a small magnitude resistor 69. Resistor 69 is connected in the circuit with the gate and cathode electrodes of SCR 64 and triggers this SCR to a state of conduction. Also connected in circuit with the gate and cathode electrodes of this SCR is a network consisting of a parallel connected capacitor 70 and resistor 71. It is important to note that SCR 64 is not of the gate turnoff type.

The circuitry by which I achieve turn-on and turn-off of SCR 64 is a novel circuit utilizing the charging of capacitor 70 which is effective to reverse bias the gate-to-cathode circuit of the SCR and to current starve the anode-to-cathode circuit causing the SCR to turn off by means of this internally generated turn-off signal.

In a specific embodiment of my invention resistor 69 was 47 ohms, resistor 71 was 750 ohms, capacitor 70 was 3.3 microfarads and SCR 64 was a General Electric type C6F SCR. With such a construction a one volt, 10 microsecond input signal across resistor 69 is effective to trigger SCR 64 to a conductive state for a time period of .5 milliseconds. The turn off mechanism is believed to be achieved by virtue of a build up of charge on capacitor 70 which renders the gate electrode of SCR 64 negative with respect to both the anode and the cathode of this SCR. It is to be emphasized that turn-off is not achieved by any direct current blocking due to capacitor 70, and in fact the presence of resistor 71 prevents turnoff by this method, since it provides a path for current to flow, such current being well above the minimum SCR holding current.

Upon SCR 64 being rendered conductive, terminal 72 becomes more negative and transistor 65 is rendered non-conductive. As transistor 65 is rendered non-conductive terminal 73 becomes more positive and a charging current for timing capacitor 74 is established through diode 65. Also, transistor 66 is rendered conductive, conduction of this transistor energizing the winding of relay R1.

As I have mentioned, SCR 64 is conductive for only a short time period, .5 milliseconds, for each half cycle of the AC source 55, the number of conduction periods being determined by the magnitude of the error signal present at terminals 17 and 18. Likewise, transistor 65 cycles between conductive and non-conductive states in a similar manner. However, so long as transistor 65 continues to cycle, timing capacitor 74, whose discharge circuit forms a turn-on bias for transistor 66, maintains transistor 66 continuously conductive and relay R1 continuously energized. The timing of capacitor 74 is such as to maintain the winding of relay R1 energized for approximately 30 milliseconds after transistor 65 ceases to cycle as a result of the absence of the required polarity voltage at terminals 17 and 18.

Reference numeral 76 (FIGURE 1b) identifies a similar timing capacitor which is connected in circuit with a diode 77 to be charged in a manner similar to that above described in connection with capacitor 74. Capacitor 76 is connected to control the conduction of a transistor 78, the output of which is connected to control the energization of the winding of relay R3. As with transistor 66, transistor 78 is rendered conductive upon non-conduction of transistor 65 and is maintained continuously conductive to maintain the winding of relay R3 continuously energized so long as transistor 65 continues to cycle.

The timing achieved by capacitor 76 is such as to maintain the winding of relay R3 energized for 15 milliseconds after the interruption of the proper polarity signal at terminals 17 and 18.

A further output from resistor 68 is achieved to the primary of pulse transformer 19, a pulse being provided at this transformer for each half cycle of the source 55 and at a time during this half cycle as determined by the magnitude of the voltage present at terminals 17 and 18.

The above description has dealt with the forward drive network 13 and the manner in which relays R1 and R2 are energized. A similar description pertains to reverse drive network 14 and the manner in which relays R2 and R4 are energized.

For a better understanding of my invention, I will now describe the various modes of operation of the structure disclosed in FIGURES 1a, 1b, and 1c.

If it is first assumed that a forward drive error signal is provided at terminal 17 and 18 (terminal 18 positive), then transistor 15 is conductive and capacitor 67 charges, the beginning of the charging period being reinstituted for each half cycle of the voltage source 55. In this manner, a pulse of voltage is provided at windings 41 and 42 (FIGURE 1b) for each half cycle of source 55 and the windings of relay R1 and R3 are maintained continuously energized.

The normally open switches R1–3 and R1–4 of relay R1 are effective when closed to shunt the gate electrode of modulating SCR's 39 and 40 of the reverse drive bridge rectifier 22. The normally closed switches R4–1 and R4–2 of relay R4, which relay is now deenergized, are effective to shunt the gate electrode of direction SCR's 35 and 36 of the reverse drive bridge 22, and thus this bridge is rendered inoperative.

With relay R3 energized, switches R3–1 and R3–2 open and remove a shunt from the gate electrode of the directional SCR's 33 and 34 of the forward drive bridge network 21. These SCR's are now triggered to a state of conduction by means of voltage sources 45 and 46.

At this time relay R2 is deenergized and since the normally open switches R2–3 and R2–4 are open, the gates of modulating SCR's 37 and 38 are controlled by the pulse sources of trigger voltage at windings 41 and 42 such that modulating energization of motor 12 is achieved to provide the desired speed and direction of rotation of this motor.

If it is now assumed that a change in the DC input control signal requires a reverse drive of the motor, the polarity of voltage at terminals 17 and 18 reverses such that terminal 17 is positive. Thus, the pulses at transformer 19 are interrupted and the 15 millisecond and 30 millisecond time delay is instituted for deenergization of relays R3 and R1 respectively.

Since relay R1 is energized, switches R1–3 and R1–4 are closed to not only shunt the gate electrodes of modulating SCR's 39 and 40, but likewise the secondary windings 43 and 44 of transformer 20 are shunted to load the output of unijunction transistor 79 of the reverse drive network 14. Thus, even though the polarity of voltage at terminals 17 and 18 is such as to render transistor 16 conductive, no signal pulse is provided at the primary winding of transformer 20 until relay R1 is deenergized, as it is after the 30 millisecond time delay.

After this 30 millisecond time delay, relays R1 and R3 are deenergized and the above described operation is effective to energize relays R2 and R4 by virtue of operation of reverse drive network 14. The function of the switches of relays R2 and R4 correspond to the above described function of the switches of relay R1 and R3 respectively. The effect of these switches is to render the forward drive bridge network 21 inoperative and to render the reverse drive bridge network operative to energize motor 12 in a reverse direction. At this time the motor is rotating in a forward direction and a counter EMF is present at the motor terminals. This counter EMF is dissipated through the SCR's of the reverse drive bridge network 22 and the motor is also energized to provide plugging of the motor, achieving a sudden slow down and the reverse rotation of the motor, until the new command speed is achieved.

It will now be assumed that while the motor was rotating in a forward direction, the input control signal was modified to require a reduction in speed in the forward direction, rather than a reversal in direction of rotation of the motor. The effect at input terminals 17 and 18 is initially similar to that which is achieved when a reversal in direction of the motor is required. In other words, terminal 17 becomes positive and the above described operation to provide dynamic braking and plugging of the motor is again achieved.

However, in this case the error signal present at terminals 17 and 18 will be reduced to zero and will actually reverse in polarity as the motor approaches the new lower command speed in a forward direction. At this time, it is necessary to reset the reverse drive bridge 22 to a state of inoperativeness and to again energize the forward drive bridge 21 to maintain this new reduced forward speed. I achieve this result in a unique manner by operation of my invention during the time period between the 15 millisecond time delay of relay R4 and the 30 millisecond time delay of relay R2.

If it is assumed that the motor is approaching the new reduced command speed, in the forward direction, the reverse drive bridge network 22 is energized at this time to dynamically brake and plug the motor. Very shortly, a speed is reached where the error voltage at terminals 17 and 18 is reduced to a low magnitude, near zero, and the reverse drive network 17 is no longer effective to modulate the modulating transistors 39 and 40 to a conductive condition. SCR's 35 and 36 are still conducting, however, due to the presence of the motor counter EMF. At this time the 15 millisecond time delay for relay R4 and the 30 millisecond time delay for relay R2 is instituted.

At the end of the 15 millisecond time period, relay R4 is deenergized. Deenergization of relay R4, with relay R2 still energized, is effective to remove the sources 47 and 48 from the gates of SCR's 35 and 36, and also to connect pulsating sources 51 and 52 to the gate electrodes of SCR's 39 and 40 to render these SCR's conductive at the peak of the AC source to which the apparatus is synchronized. By virtue of this synchronization to the peak of the AC source the motor counter EMF is overcome, and the reverse drive bridge network 22 is rendered conductive at the voltage peak of the AC source 23–24 and current is conducted through one of the modulating SCR's 39 or 40 and through its oppositely disposed directional SCR 36 or 35 respectively. This operation has the effect of commutating the other modulating SCR and the other directional SCR to an off condition. On the succeeding half cycle of the AC source 23 and 24, the AC source is connected through the modulating SCR and the directional SCR which were effective on the preceding half cycle and this connection is in opposition to the counter EMF of motor 12, to effectively commutate this modulating SCR and directional SCR to an off condition. Thus in one cycle of the AC source 23 and 24, the reverse drive bridge is commutated to an off condition and at the end of the 30 millisecond time delay, when relay R2 is deenergized, the forward drive bridge is energized to maintain the speed of rotation of the motor at the new lower speed in the forward direction.

From the above description it can be seen that I have provided an improved control apparatus which includes a unique SCR gate turn off network which is utilized to derive a plurality of output effects, these output effects being utilized in a unique manner to control the bridge rectifiers which are connected to servo reversibly control a motor.

Since other modifications of my invention will be apparent to those skilled in the art, it is intended that the scope of my invention be limited solely by the scope of the appended claims.

I claim as my invention:

1. Control apparatus for use in servo controlling a reversible DC motor from a DC input signal which is summed with a motor produced DC velocity feedback signal to produce an error signal, the apparatus comprising:
   first and second polarity responsive control means adapted to be connected to the error signal, each control means being responsive to an error signal of opposite polarity,
   first and second output relay means, each relay means being connected to be controlled by one of said control means,
   first and second controllable rectifier bridge rectifier networks, each network having an input connected to a source of AC voltage and having an output adapted to be connected to the motor to energize the motor causing rotation in opposite directions,
   and circuit means controlled by said first and second output relay means selectively effective to connect one of said networks in controlled relation to one of said control means and to render the other of said networks and the other of said control means inoperative, dependent upon the polarity of the error signal.

2. Control apparatus for use in the servo control of a variable speed reversible DC motor from a variable magnitude reversible polarity DC error signal which is the sum of a variable magnitude reversible polarity DC control signal and a variable magnitude reversible polarity DC feedback signal which is generated by the motor, the apparatus comprising;
   first and second control means, said first control means having an input responsive to a signal of a first polarity and said second control means having an input responsive to a signal of an opposite polarity, and said first and second control means each having relay output means arranged to be actuated upon the presence of an error signal of the proper polarity and having further modulating output means having a characteristic which is variable with the magnitude of the error signal,
   first and second SCR bridge rectifiers, each bridge rectifier having an input adapted to be connected to a source of AC voltage and having an output adapted to be connected to the motor to reversibly energize the motor,
   first means including the modulating output of said first control means connected in controlling relation to a first adjacent pair of the SCR's of said first bridge rectifier to modulate the conduction thereof,
   second means including the relay output means of said first control means connected in controlling relation to a second adjacent pair of the SCR's of said first bridge rectifier to render the same conductive,
   third means including the modulating output of said second control means connected in controlling relation to a first adjacent pair of the SCR's of said second bridge rectifier to modulate the conduction thereof,
   and further means including the relay output means of said second control means connected in controlling relation to a second adjacent pair of the SCR's of said second bridge rectifier to render the same conductive.

3. Control apparatus as defined in claim 2 wherein the relay output means of said first and second control means is effective to render the four SCR's of one of said first and second SCR bridge rectifiers inactive when the other of said bridge rectifiers is operative to energize the motor.

4. Control apparatus for use in the servo control of a variable speed reversible DC motor whose speed and direction of rotation are determined by the magnitude and polarity of a DC control signal, the motor being connected to drive feedback means to originate a DC feedback signal whose magnitude and polarity are determined by the speed and direction of rotation of the motor, and the control signal and feedback signal being summed to provide an error signal, the apparatus comprising:
   a forward drive channel and a reverse drive channel, each channel having an input responsive to an error signal of a first and the opposite polarity, respectively, unijunction output means including a unijunction transistor synchronized to a source of AC voltage and connected to said input in a manner to conduct each half cycle of the AC voltage at a time dependent upon the magnitude of the error signal, timing means, and relay output means controlled by said unijunction transistor and said timing means to be energized upon the conduction of said unijunction transistor and to be deenergized a time period after said unijunction ceases conducting,
   a forward drive bridge rectifier and a reverse drive bridge rectifier, each rectifier having four SCR's interconnected to form a pair of input terminals adapted to be connected to the source of AC voltage and a pair of output terminals adapted to be connected to the motor,
   circuit means connecting the unijunction output means of said forward drive channel and the unijunction output means of said reverse drive channel to modulate the conduction of the two SCRs of said forward drive bridge and said reverse drive bridge respectively which are connected to one of the input terminals,
   circuit means controlled by the relay output means of said forward drive channel and the relay output means of said reverse drive channel to render conductive the two SCR's of said forward drive bridge and said reverse drive bridge respectively,
   and circuit means controlled by the relay output means of said forward drive channel and said reverse drive channel effective to render one of said drive bridges inoperative when the other is operative to energize the motor.

5. Control apparatus for use in achieving reversible servo control of a DC motor from a variable magnitude reversible polarity DC signal which is summed with a motor generated feedback signal to produce a resultant error signal, the apparatus comprising;

a forward drive SCR bridge rectifier having input terminals adapted to be connected to a source of AC voltage and output terminals adapted to be connected to the motor to energize the motor for rotation in a forward direction, a reverse drive SCR bridge rectifier structurally similar to said forward drive bridge rectifier and effective to energize the motor for rotation in a reverse direction, a forward drive control network having an input responsive to an error signal of a first polarity, having a first modulating pulse output synchronized to the source of AC voltage with the time of occurrence of the pulse being dependent upon the magnitude of the error signal, and having first and second steady state outputs dependent upon the presence of the error signal and including means to delay the interruption of said first steady state output for a first time period and to delay the interruption of said second steady state output for a second longer time period after the error signal is interrupted, a reverse drive control network structurally similar to said forward drive control network having an input responsive to an error signal of a polarity opposite to said first polarity, first circuit means connecting the outputs of said forward drive control network to the SCR gate electrodes of said forward drive rectifier to modulate the conduction of said forward drive rectifier in accordance with the magnitude of an error signal of said first polarity and to reset said forward drive rectifier upon the interruption of the error signal, second circuit means connecting the outputs of said reverse drive control network to the SCR gate electrodes of said reverse drive rectifier to modulate the conduction of said reverse drive rectifier in accordance with the magnitude of an error signal of said opposite polarity and to reset said reverse drive rectifier upon the interruption of the error signal, and third circuit means connecting the first and second outputs of said forward drive control network to the SCR gate electrodes of said reverse drive rectifier and connecting the first and second outputs of said reverse drive control network to the SCR gate electrodes of said forward drive rectifier to provide dynamic braking and reverse energization of the motor in the time period between said first time period and said second time period upon a transient reversal of polarity of the error signal which is indicative of a command to reduce the speed of the motor.

6. Control apparatus for use in the servo control of a reversible DC motor from a variable magnitude and reversible polarity DC control signal, the apparatus comprising;

a first electrical signal network having an input responsive to an error signal of a first polarity, a unijunction transistor which is synchronized to an AC voltage source with the time of firing dependent upon the magnitude of the error signal, a control SCR having a parallel connected capacitor and resistor connected in circuit with the anode and cathode thereof to a source of DC voltage and also connecting in circuit with the gate and cathode thereof to the output of said unijunction transistor such that said capacitor functions to gate-turn-off said control SCR, a first modulating output controlled by said unijunction transistor, timing means, and a second steady state output including said timing means and controlled by said unijunction transistor to provide an output so long as said unijunction continues to fire at a rate determined by the frequency of the AC voltage source, and the magnitude of the DC control signal, a second electrical signal network structurally identical to said first electrical signal network with the exception that the input of said second electrical signal network is responsive to an error signal of a polarity opposite to said first polarity, a first SCR bridge rectifier network having a pair of input terminals connected to the AC voltage source and having a pair of output terminals adapted to be connected to the DC motor to energize the motor for rotation in a first direction, a second SCR bridge rectifier network structurally identical to said first SCR bridge network with the exception that the output of said second SCR bridge rectifier network is adapted to energize the motor for rotation in a direction opposite to said first direction, an electrical circuit means interconnecting the outputs of said first and second electrical signal network and the SCR's gate electrodes of said first and second SCR bridge rectifier networks in a manner to render one of said rectifier networks operative and the other inoperative, the first modulating output of said signal network serving to modulate the conduction of two of the SCR's of the operative rectifier network and the second steady state output of said signal networks serving to maintain two of the SCR's of the operative rectifier network continuously conductive.

7. Control apparatus for use in achieving servo control of a reversible DC motor from a DC control signal which is summed with a motor originated feedback signal to produce a resultant error signal, the apparatus comprising;

a forward drive network having an input responsive to an error signal of a given polarity, a pulse output which is synchronized to an AC source to occur at a time dependent upon the magnitude of the error signal, a first relay output energized by said pulse output and including time delay means to delay the deenergization of said first relay output for a first time period after the interruption of the error signal, and a second relay output energized by said pulse output and including time delay means to delay the deenergization of said second relay output for a second time period longer than said first time period, a reverse drive network similar in its construction to said forward drive network and having an input responsive to an error signal of an opposite polarity;

a forward drive bridge rectifier having two directional SCR's which are series connected in the forward direction between a negative output terminal and a positive output terminal the output terminals being adapted to be connected to first and second terminals respectively of the motor, having two modulating SCR's which are series connected in the forward direction between said negative output terminal and said positive output terminal, and having terminals at the junctions of said directional SCR's and said modulating SCR's adapted to be connected to the AC source, a reverse drive bridge rectifier similar in its construction to said forward drive rectifier and having its negative output terminal and its positive output terminal adapted to be connected to the second and first terminals respectively of the motor, first circuit means including the pulse output of said forward drive network and the second relay output of said reverse drive network connected in controlling relation to the modulating SCR's of said forward drive bridge to modulate the conduction thereof upon the presence of an error signal of said given polarity, and to render said SCR's inoperative upon the presence of an error signal of said opposite polarity, second circuit means including the pulse output of said reverse drive network and the second relay output of said forward drive network connected in controlling relation to the modulating SCR's of said reverse drive bridge to modulate the conduction thereof upon the presence of an error signal of said opposite polarity and to render said SCR's inoperative upon the presence of an error signal of said given polarity, third circuit means including the first relay output of said forward drive network connected in controlling relation to the directional SCR's of said forward drive bridge to render the same conductive upon the presence of an error signal of said given polarity, fourth circuit means including the first relay output of said reverse drive network connected in controlling relation to the directional SCR's of said reverse drive bridge to render the same conductive upon the presence of an error signal of said opposite polarity, fifth circuit means including the first and second relay outputs of said forward drive network when deenergized and energized respectively connected in controlling relation to the modulating SCR's of said forward drive bridge to reset said bridge after a period of a command slow down of the motor as it rotates in a reverse direction, and sixth circuit means including the first and second relay outputs of said reverse drive network when deenergized and energized respectively connected in controlling relation to the modulating SCR's of said reverse drive bridge to reset said bridge after a period of a command slow down of the motor as it rotates in a forward direction.

References Cited

UNITED STATES PATENTS

| | | | |
|---|---|---|---|
| 2,783,427 | 2/1957 | Bracutt | 318—327 X |
| 3,237,075 | 2/1966 | Sommeria | 318—327 |
| 3,302,089 | 1/1967 | Rosa et al. | 318—327 X |

ORIS L. RADER, *Primary Examiner.*

J. J. BAKER, *Assistant Examiner.*